Figure 9:
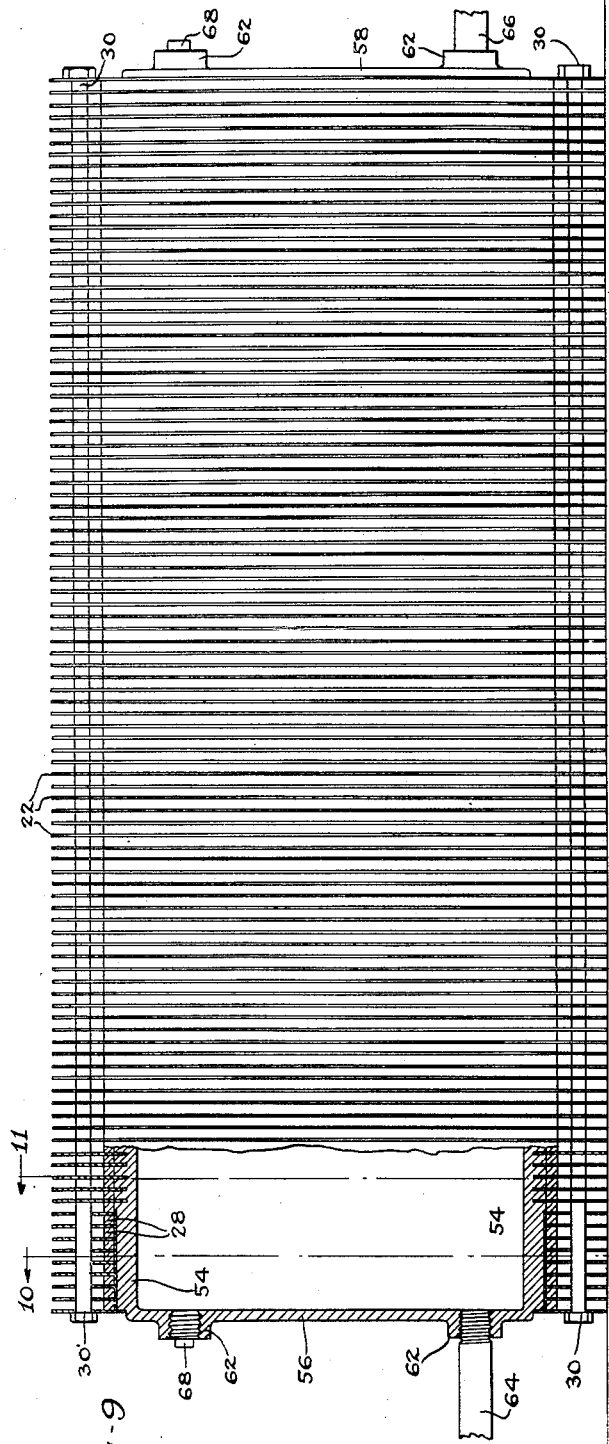

Jan. 7, 1930.                    J. O. OLSON                    1,742,556
                PROCESS OF MANUFACTURING RADIATORS AND SIMILAR ARTICLES
                         Filed Feb. 4, 1927        7 Sheets-Sheet 1
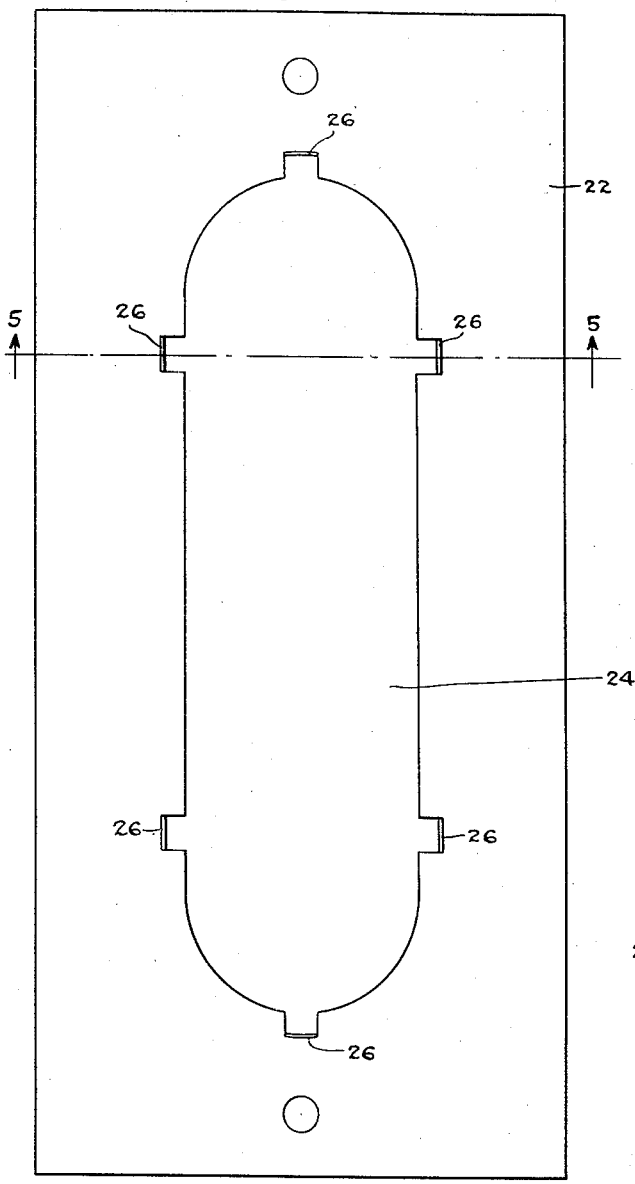
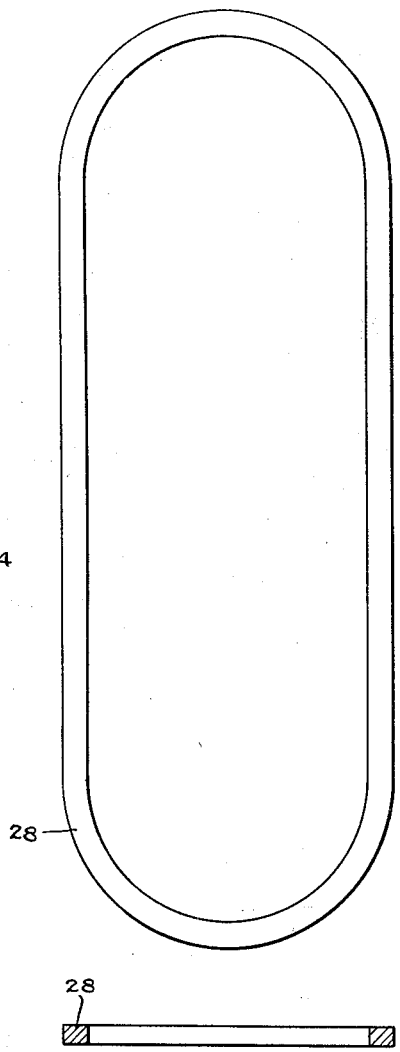
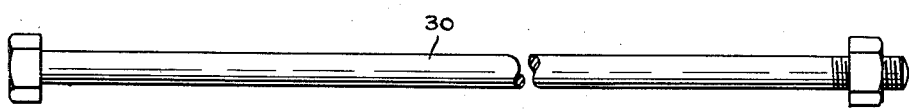
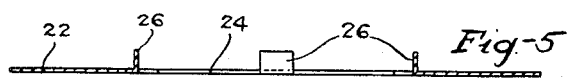
Inventor
John O. Olson.
By Whiteley and Ruckman
Attorneys Jan. 7, 1930. J. O. OLSON 1,742,556
PROCESS OF MANUFACTURING RADIATORS AND SIMILAR ARTICLES
Filed Feb. 4, 1927 7 Sheets-Sheet 2
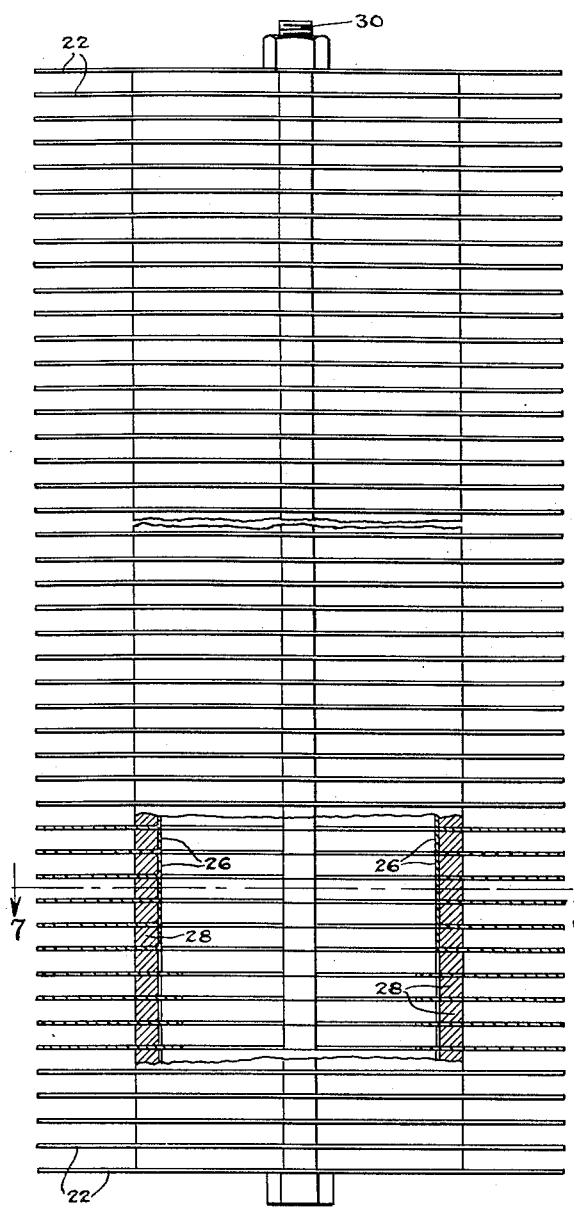
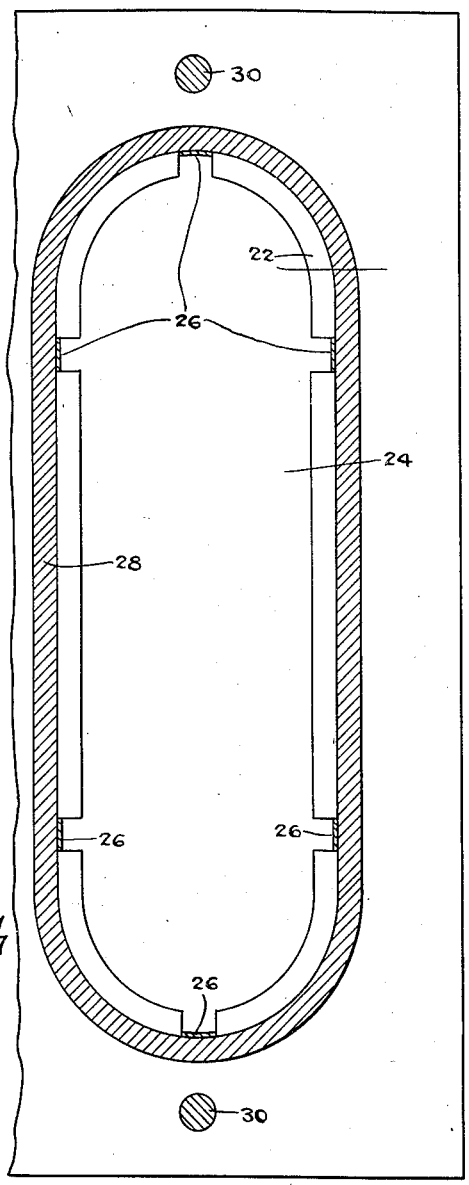
Inventor:
John O. Olson.
By Whiteley and Ruckman
Attorneys

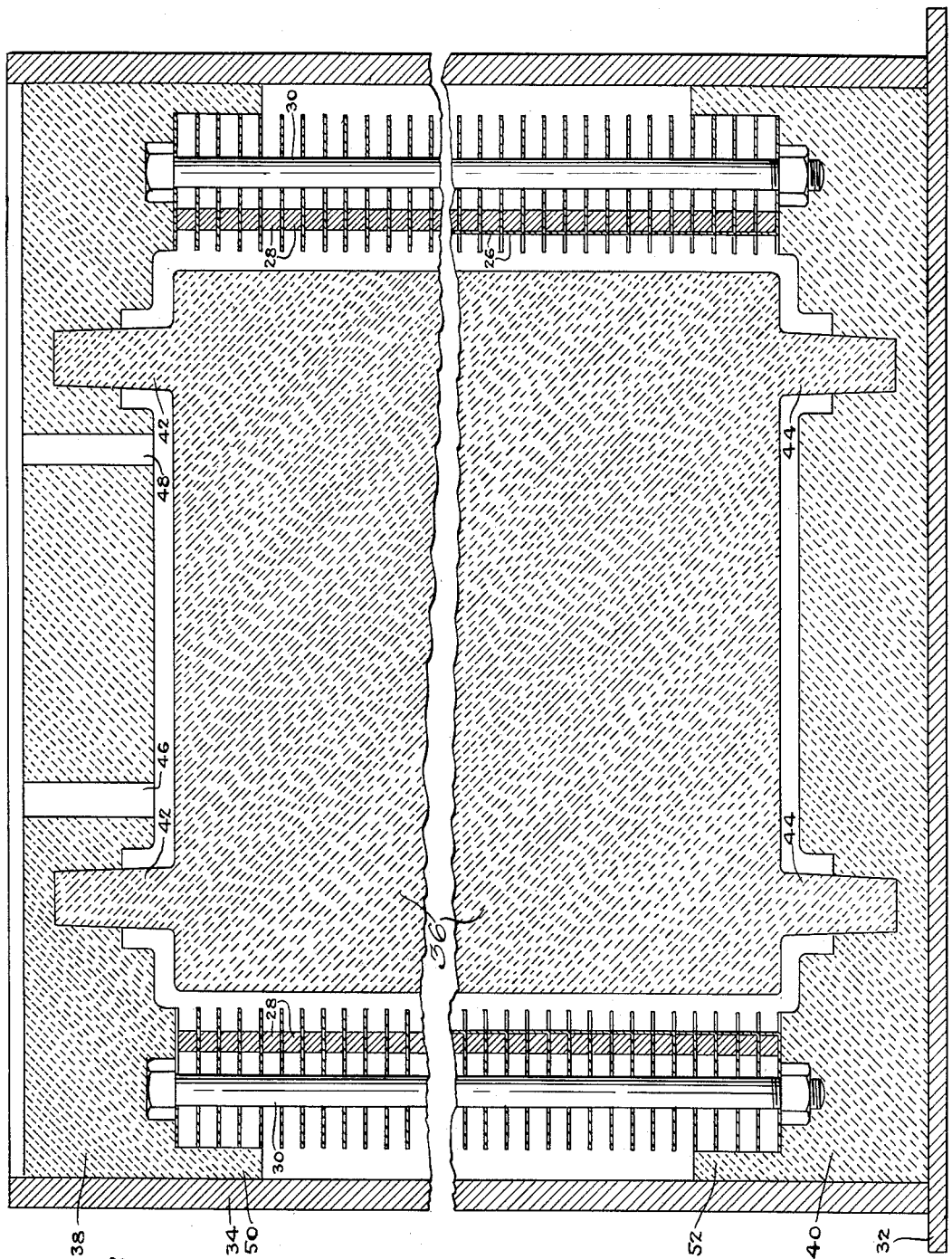

Jan. 7, 1930. J. O. OLSON 1,742,556
PROCESS OF MANUFACTURING RADIATORS AND SIMILAR ARTICLES
Filed Feb. 4, 1927 7 Sheets-Sheet 4

Inventor:
John O. Olson.
By Whiteley and Ruckman
Attorneys.

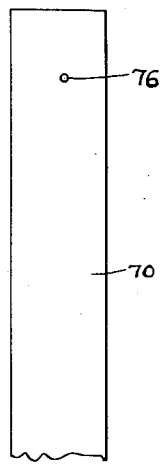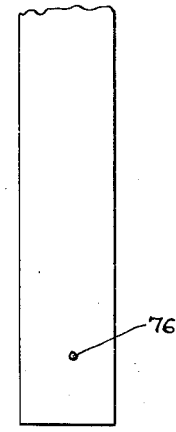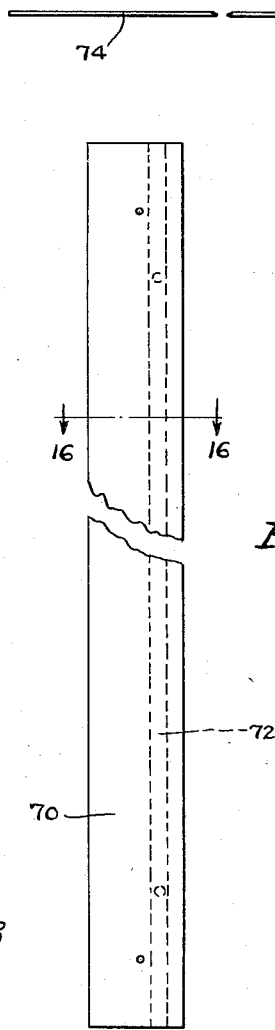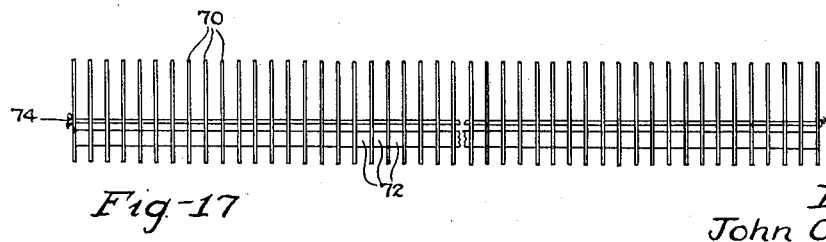

Jan. 7, 1930.  J. O. OLSON  1,742,556
PROCESS OF MANUFACTURING RADIATORS AND SIMILAR ARTICLES
Filed Feb. 4, 1927   7 Sheets-Sheet 6
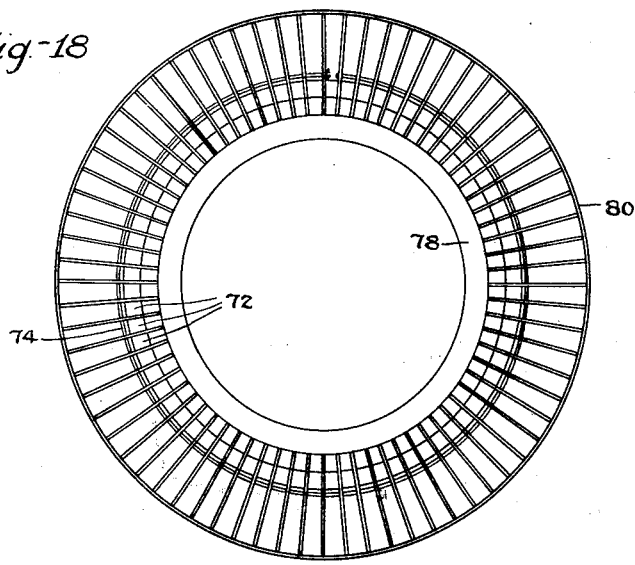
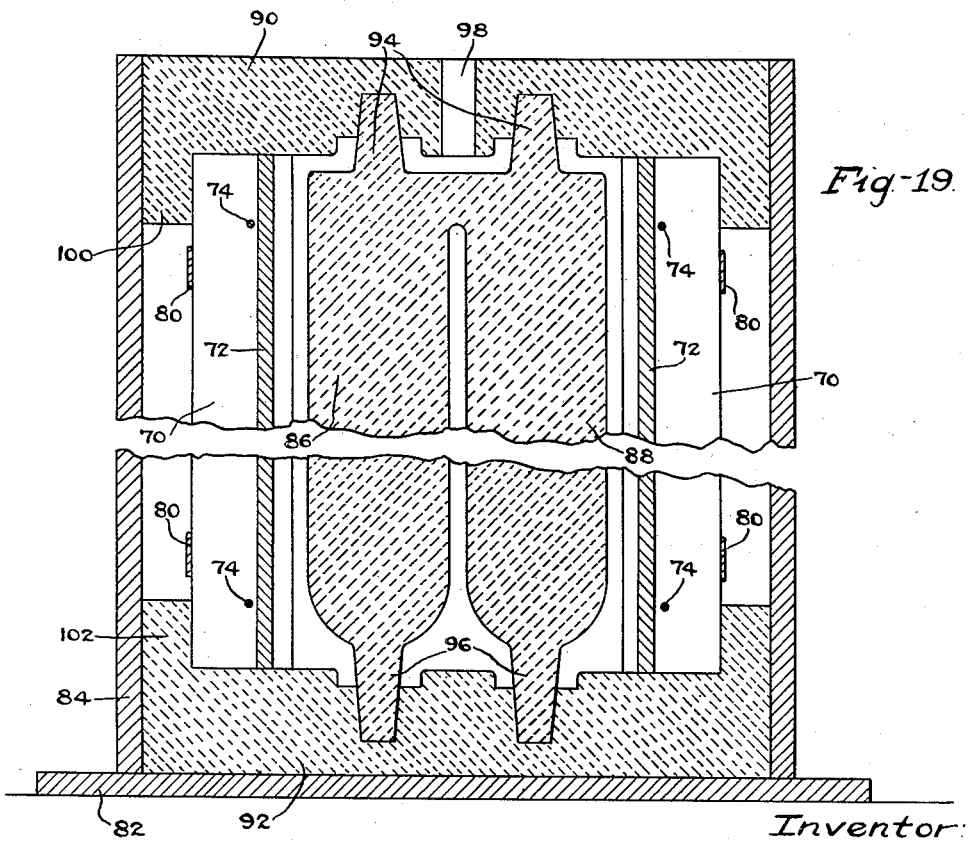
Inventor:
John O. Olson.
By Whiteley and Ruckman
Attorneys Jan. 7, 1930.  J. O. OLSON  1,742,556
PROCESS OF MANUFACTURING RADIATORS AND SIMILAR ARTICLES
Filed Feb. 4, 1927  7 Sheets-Sheet 7
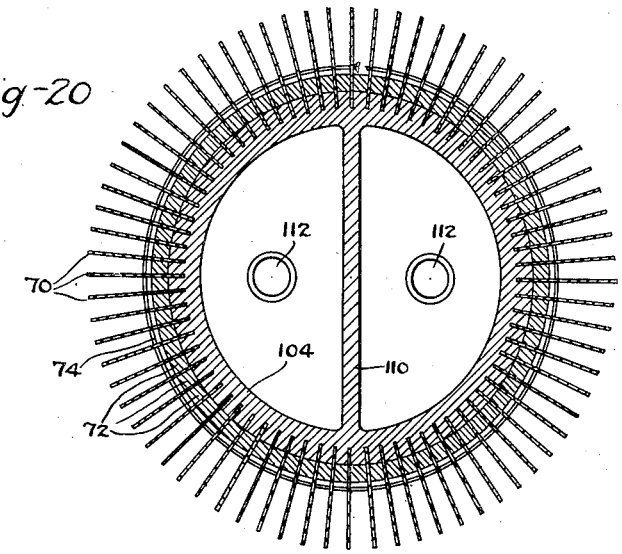
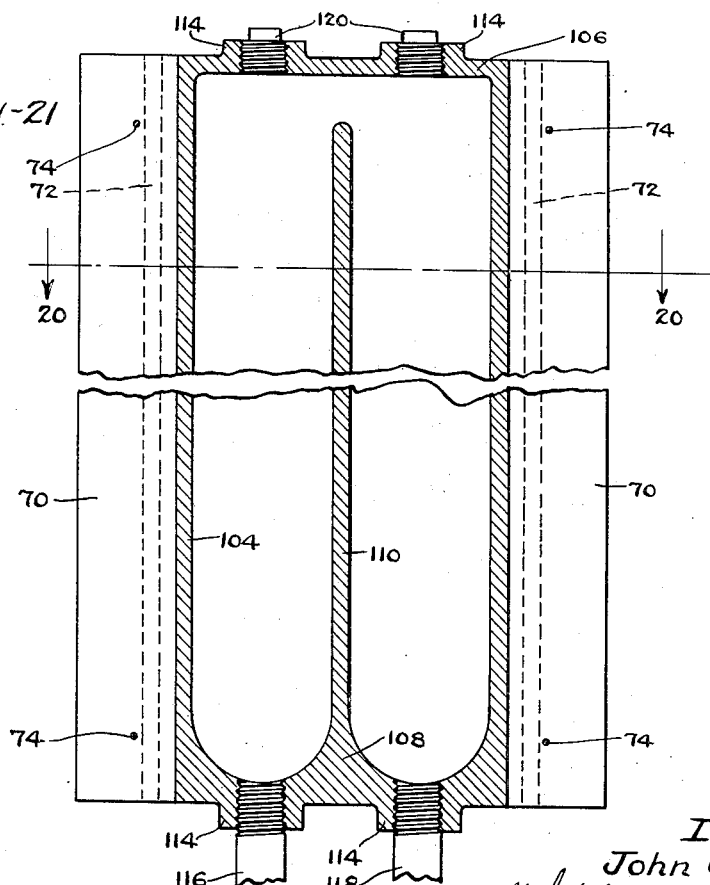
Inventor;
John O. Olson.
By Whiteley and Ruckman
Attorneys Patented Jan. 7, 1930

1,742,556

UNITED STATES PATENT OFFICE

JOHN OTTO OLSON, OF ST. PAUL, MINNESOTA

PROCESS OF MANUFACTURING RADIATORS AND SIMILAR ARTICLES

Application filed February 4, 1927. Serial No. 165,860.

My invention relates to process of manufacturing radiators and similar articles and more particularly to radiators which are used in connection with steam and hot water heating plants. Objects of the invention are to provide a radiator which has a much greater radiating surface than customary radiators now in use, to provide a radiator which may be economically and conveniently manufactured, and to provide a radiator which is extremely strong and durable. I accomplish the objects of my invention by providing a plurality of metal sheets and metal spacer elements, placing together a plurality of the sheets and spacer elements in alternation to produce a built-up structure having an enclosing wall with open ends, placing the built-up structure in molding position together with core and mold members and pouring molten metal into said built-up structure. It will be understood that the core and mold members are so positioned that the built-up structure is lined with cast metal and the open ends are completed by the cast metal whereby a cast metal shell is formed. The built-up structure is produced in such manner that the metal sheets have inner and outer margins or projections extending out from the spacer elements. When the molten metal is poured, it becomes attached to the inside of the spacer elements while the projecting inner margins of the metal sheets are anchored in the cast metal. In this manner, the finished radiator is in effect an integral structure in which the cast metal is reinforced by sheet metal and in which the outer margins of the metal sheets project out from the spacer elements in the nature of fins so that the radiating surface is greatly increased over that of a comparatively smooth surfaced radiator. For producing the built-up structure, I have found that scrap metal may be utilized with extremely good results whereby the cost of the completed article is greatly reduced. Furthermore, the built-up structure in effect constitutes part of the mold, so that the molding operation is very much simplified. It is not necessary to provide any wooden patterns for use in the molding operation, and no molding in damp sand is required, it being necessary only to provide the requisite core and mold members in addition to the built up structure.

The full objects and advantages of my invention will appear in connection with the detailed description thereof, and the novel features of my inventive idea will be particularly pointed out in the claims.

Referring to the accompanying drawings, which illustrate two of the forms in which my invention may be embodied,—

Figure 10:
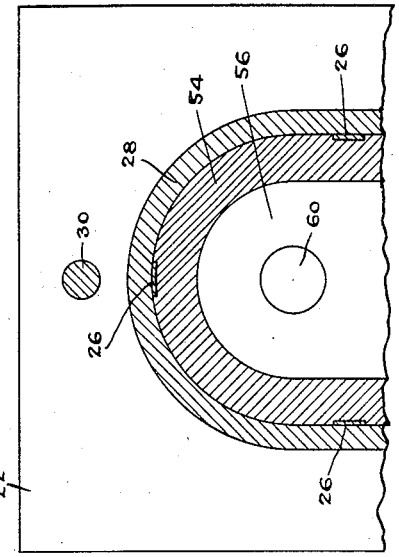
Figure 11:
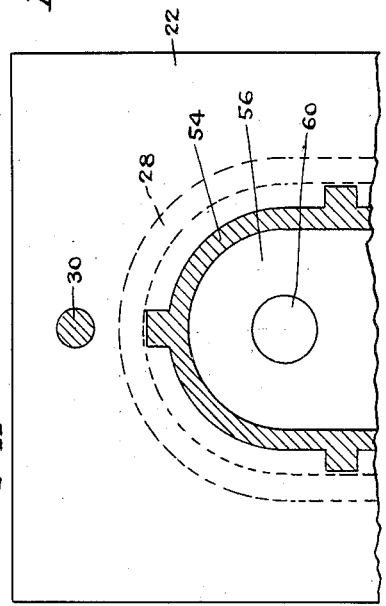

Fig. 1 is a plan view of one of the metal sheets which I employ. Fig. 2 is a plan view of one of the metal spacer elements which I use to separate successive sheets. Fig. 3 is an elevational view of one of the bolts used for securing together a plurality of sheets after they have been built up. Fig. 4 is a cross sectional view of one of the spacer elements. Fig. 5 is a cross sectional view on the line 5—5 of Fig. 1. Fig. 6 is an elevational sectional view of the built-up structure before being placed in molding position. Fig. 7 is a view in section on the line 7—7 of Fig. 6. Fig. 8 is a view in vertical section showing the built-up structure placed in molding position together with core and mold members and ready for the pouring operation. Fig. 9 is an elevational sectional view of the finished article. Fig. 10 is a fragmentary view in section on the line 10—10 of Fig. 9. Fig. 11 is a fragmentary view in section on the line 11 of Fig. 9. Fig. 12 is a plan view of another form of metal sheets which I may employ. Fig. 13 is a plan view of one of the spacers which I employ with the latter form of sheets. Fig. 14 is a fragmentary view of one of the wires or rods on which the sheets are strung. Fig. 15 is a plan view of a sheet with a spacer element welded thereto. Fig. 16 is a view in section on the line 16—16 of Fig. 15. Fig. 17 is an elevational view of the built-up structure of this latter form of invention before being bent into shape. Fig. 18 is a plan view of the built-up structure bent into shape and before being placed in molding position. Fig. 19 is a view in vertical section showing the built-up structure placed in molding position together with core and mold members and ready for the pouring operation. Fig. 20 is a view of the finished article in transverse section on the line 20—20 of Fig. 21. Fig. 21 is a view in vertical section of the finished article.

Referring first to the form of invention shown in Figs. 1 to 11, the numeral 22 designates a metal sheet which has an oval opening 24 cut out from its middle. The material around this opening is provided with pairs of outwardly extending cuts at different places whereby tongues are produced, these tongues being turned up at right angles to the sheet to produce lugs 26. As shown, there is one of these lugs at each end of the oval opening and two of the lugs at each side thereof. A large number of the metal sheets may be quickly stamped from scrap pieces of sheet metal. In order to build up a plurality of the sheets 22 in spaced relation to each other, metal oval rings 28 are provided these rings being of such shape and size as to fit nicely around the lugs 26. The spacer rings 28 hold the piled-up sheets 22 in separated position as shown in Fig. 6, the proper number of sheets and intervening spacers being employed to produce the desired length whereupon they are firmly secured together by means of bolts 30 passing through holes in the sheets. The structure thus built-up is placed in molding position and for this purpose a molding flask may be employed if desired. In Fig. 8, the numeral 32 designates a bottom plate upon which a flask 34 of ordinary construction is placed. Before the built-up structure is inserted in the flask, a central sand core 36 and upper and lower mold members 38 and 40 are provided. The center core 36 on its upper surface is provided with two round slightly tapering projections 42, while its lower surface is provided with two similar projections 44. The lower mold member 40 is first placed in the flask and the center core 36 is placed in position, it being observed that the lower mold member contains recesses which receive the projections 44 in such manner that a space for molten metal is left between the two members. The built-up metal structure is then placed around the center core, the diameter of the latter being less than the distance between the inner margins of the sheets 22 so that a space for molten metal is provided between the center core and the spacer rings 28, this space including the inner margins of the sheets. The upper mold member 38 is now placed over the center mold member, the upper mold member containing recesses which receive the projections 42 in such manner that a space for molten metal is left between these two members. The upper mold member is provided with gates or holes 46 and 48 through which the molten metal is poured and through which the air may escape. The upper and lower mold members are provided with peripheral flanges 50 and 52 which hold the built up structure properly positioned. When the molten metal is poured, the inner margins of the sheets 22 are firmly imbedded therein and the molten metal becomes firmly attached to the lugs 26 and the spacer rings 28 so that the casting and built-up structure become in effect integral with each other. Referring to the sectional view shown in Fig. 8, the upper and lower portions thereof are shown in slightly different vertical planes so that the lugs 26 appear in the lower portion and do not appear in the upper portion. The appearance of the finished article is shown in Figs. 9, 10 and 11 in which the numeral 54 indicates the cast oval shaped wall while the cast end walls are indicated by the numerals 56 and 58. The projections 42 and 44 of the end mold members produce openings 60 which are surrounded by external bosses 62. These openings are screw-threaded so that opposite ends of the radiator may be supplied with inlet and outlet pipes 64 and 66, the other two openings being closed by screw plugs 68.

Referring to the form shown in Figs. 12 to 21, the numeral 70 designates a metal sheet or strip and the numeral 72 designates a metal spacer element which is spot welded to the sheet 70 between the middle and one side thereof as shown in Figs. 15 and 16. A built-up structure is produced by piling up a plurality of the composite elements as shown in Fig. 17 and securing them together by rods or wires 74 which pass through holes 76 in the sheets. This built-up structure is then bent into curved shape around a mandrel 78 as shown in Fig. 18 and is secured in this shape by hoops 80. Before the built up structure is placed in molding position, the mandrel 78 is removed. In this form of the invention as well as in that previously described, a flask may be employed to keep the parts in proper position. In Fig. 19, the numeral 82 designates a bottom plate upon which a flask 84 of ordinary construction is placed. A central bifurcated sand core is provided, the two parts 86 and 88 thereof being connected to each other at one end only. Upper and lower mold members 90 and 92 are also provided. The center core on its upper surface is provided with two rounded slightly tapering projections 94 while its lower surface is provided with two similar projections 96. The lower member 92 is first placed in the flask and the center core 86—88 is placed in position, it being observed that the lower member contains recesses into which the projections 96 fit. The built-up metal structure is then placed around the central core, the diameter of the latter being less than the distance between the inner margins of the sheets 70 so that a space for molten metal is provided between the core and the spacer elements 72. This space for molten metal includes the inner margins of the plates 70. The upper member 90 is now placed over the center member, the upper member containing recesses which receive the projections 94 in such manner that a space for molten metal is left between these two members. The upper member is provided with a gate or hole 98 through which the molten metal is poured and through which the air escapes. The upper and lower mold members 90 and 92 are provided with peripheral flanges 100 and 102 which hold the built-up structure properly positioned in the flask. When the molten metal is poured, the inner margins of the sheets 70 are firmly imbedded therein and the molten metal becomes firmly attached to the spacer elements 72 so that the casting and the built-up structure becomes in effect integral with each other. After the finished article is removed from the flask, the hoops 80 are removed and the article has the appearance shown in Figs. 20 and 21 in which the numeral 104 indicates the cast cylindrical wall while the cast end walls are indicated by the numerals 106 and 108. The space between the bifurcated core members 86 and 88 provides a cast partition 110 which extends up from the lower wall 108 and stops short of the upper wall 106. The projections 94 and 96 of the core member produce openings 112 which are surrounded by external bosses 114. These openings are finished by screwthreading them so that inlet and outlet pipes 116 and 118 may be attached at the lower end of the radiator, the upper openings being closed by screw plugs 120.

I claim:

1. The process of manufacturing radiators which consists in providing sheet metal members and metal spacer elements, placing together a plurality of said members and spacer elements in alternation to produce a built-up structure having an enclosing wall with open ends, said spacer elements being so disposed that inner and outer margins project in spaced relation from said built-up structure, placing said built-up structure in molding position together with a central core and two end mold members, and pouring molten metal into the interior of said built-up structure to form a cast metal shell and whereby said inner margins are anchored in the cast metal and said outer margins are left projecting beyond said spacer elements.

2. The process of manufacturing radiators which consists in producing a built-up structure consisting of a plurality of sheet metal members and metal spacer elements arranged in alternation to provide an enclosing wall with open ends, said spacer elements being so disposed that inner and outer margins project in spaced relation from said built-up structure, placing said built-up structure in molding position together with a central core and two end mold members, and pouring molten metal into the interior of said built-up structure to form a cast metal shell and whereby said inner margins are anchored in the cast metal and said outer margins are left projecting beyond said spacer elements.

3. The process of manufacturing radiators which consists in producing a built-up structure consisting of a plurality of sheet metal members and metal spacer elements arranged in alternation to provide an enclosing wall with open ends, said spacer elements being so disposed that outer margins project in spaced relation from said built-up structure, placing said built-up structure in molding position together with a central core and two end mold members, and pouring molten metal into the interior of said built-up structure to form a cast metal shell and whereby said outer margins are left projecting beyond said spacer elements.

4. The process of manufacturing radiators which consists in producing a built-up structure consisting of a plurality of sheet metal members and metal spacer elements arranged in alternation to provide an enclosing wall with open ends, said spacer elements being so disposed that inner margins project in spaced relation within said built-up structure, placing said built up structure in molding position with a central core and two end mold members, and pouring molten metal into the interior of said built-up structure to form a cast metal shell and whereby said inner margins are anchored in the cast metal and said spacer elements are fused thereto.

5. The process of manufacturing radiators which consists in providing metal sheets, cutting openings in the middle of said sheets, making pairs of cuts in the material around said openings, bending the material between the pairs of cuts at right angles to produce lugs, providing metal spacer rings of such shape and size as to fit snugly around said lugs, placing together a plurality of said sheets and rings in alternation to produce a built-up structure with the inner and outer margins of said sheets projecting from said rings, and casting a metal shell inside of said built-up structure.

6. The process of manufacturing radiators which consists in providing metal sheets, cutting openings in the middle of said sheets, making pairs of cuts in the material around said openings, being the material between the pairs of cuts at right angles to produce lugs, providing metal spacer rings of such shape and size as to fit snugly around said lugs, placing together a plurality of said sheets and rings in alternation to produce a built-up structure with the inner and outer margins of said sheets projecting from said rings, placing said built-up structure in molding position together with a central core and two end mold members, and pouring molten metal into the interior of said built-up structure to form a cast metal shell and whereby said inner margins are anchored in the cast metal and said outer margins are left projecting beyond said spacer elements.

In testimony whereof I hereunto affix my signature.

JOHN OTTO OLSON.